Patented May 12, 1953

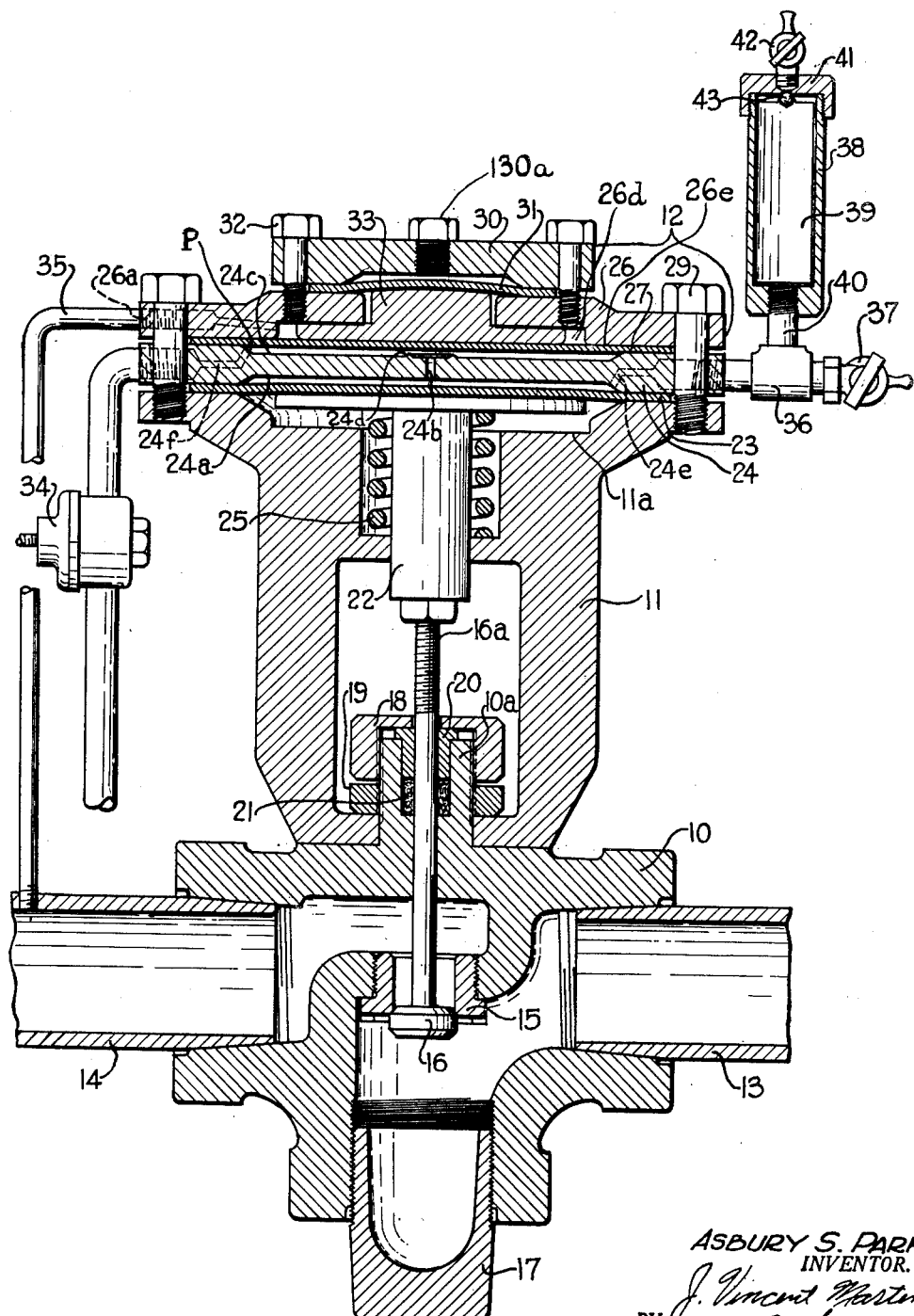

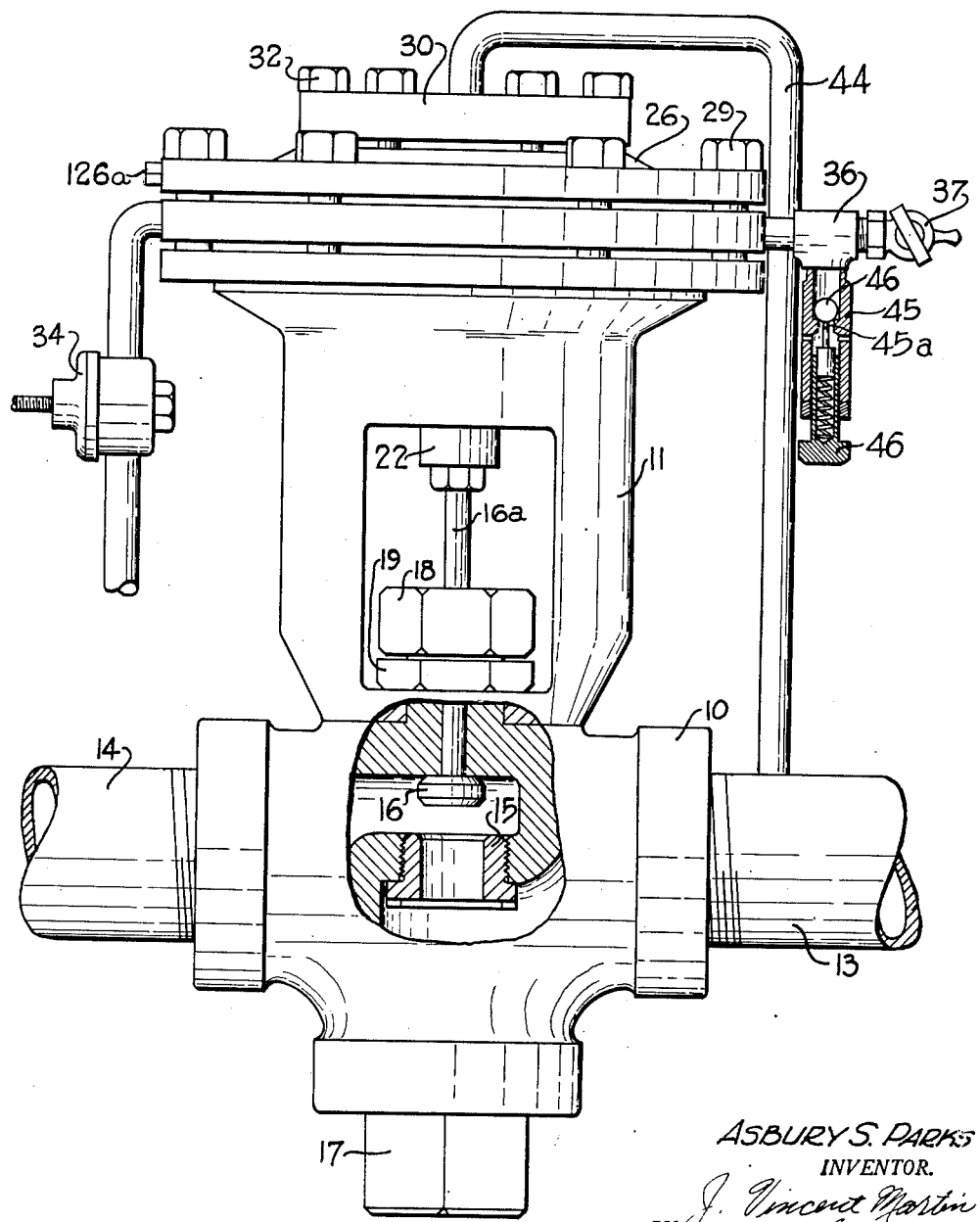

2,637,946

UNITED STATES PATENT OFFICE 2,637,946

FLUID PRESSURE REGULATOR

Asbury S. Parks, Houston, Tex.

Application December 26, 1945, Serial No. 637,272

18 Claims. (Cl. 50—12)

This invention relates to regulators and refers more particularly to pilot controls for diaphragm motor valves adaptable for use in controlling fluid pressures.

Regulators of this general type are known to the art. However, in many regulator uses it is desirable at times for the regulator to operate with a snap action and at other times with a throttle action. Heretofore, regulators have not been capable of adjustment to perform in this fashion. Also in the conventional regulators a separate valve is utilized to regulate the flow of pilot pressure to or from the motor or power diaphragm. This valve is usually actuated by a pilot diaphragm or bourdon tube. This added mechanism increases the cost of the assembly and constitutes additional working parts which are subject to wear and failure.

An object of this invention is to provide a regulator capable on adjustment of efficient performance with either a snap or a throttle action.

Another object is to provide a regulator wherein the pilot controlled diaphragm serves directly as a valve member varying the flow of pilot pressure to the motor or power diaphragm.

A further object is to provide a regulator wherein a pilot pressure may be utilized to control a relatively high pressure.

Still another object is to provide a regulator having a fixed and an intermittent bleed whereby the regulator operates with a snap action.

Yet another object is to provide a regulator wherein the flow control valve is responsive to the ratio of pilot pressure to the pressure to be controlled.

Other and further objects of this invention will appear from the following description.

In the accompanying drawings which form a part of the instant specification and are to be read in conjunction therewith and wherein like reference numerals are used to indicate like parts in the various views, Fig. 1 is a sectional side elevation of a regulator embodying this invention and Fig. 2 is a side elevation partially in section of a modified regulator.

Referring to the drawings, the regulator housing is seen to comprise three principal parts, the body 10, the bonnet or frame 11, and the dome 12.

The body is adapted to be connected between pipe 13 leading from a source of fluid pressure and connection 14 communicating with a fluid receptacle which may be either a pipe line, storage tank, or the like. The passage within the body has a seat ring 15 therein against which the valve 16 seats to close the passage. A removable plug 17 closes another port in the body passage. This latter port permits connection of the regulator with pipes 13 and 14 either at an angle or in the manner shown in Fig. 1. On the upper part of the body is a boss 10a through which the valve stem 16a extends. The boss carries a conventional stuffing box comprising nut 18, lock nut 19, packing gland 20 and packing 21.

The diaphragm motor for actuating the valve is supported by bonnet 11 which is suitably mounted on body 10. The upper end of the bonnet has a recess 11a which houses the power connection 22 carried at the upper end of the valve stem. Diaphragm 23 is stretched across recess 11a and is held in place by a divider plate 24. Connection 22 is urged upwardly by a spring 25 into contact with diaphragm 23. The spring normally holds the valve in the upper position.

The divider plate and dome plate 26 are held in place with diaphragms 23 and 27 therebetween by bolts 29. The dome cap 30 is fastened to the dome plate with diaphragm 31 therebetween by bolts 32. The control member 33 is mounted between diaphragms 27 and 31, with its upper face abutting diaphragm 31 and its lower face contacting diaphragm 27. Thus the control member form a solid connection between the diaphragms whereby the force above diaphragm 31 is transmitted directly to diaphragm 27. The area variance between the faces of the control member may be of a predetermined amount. This arrangement makes possible the use of proportionately varying pilot and controlled pressures.

Referring to the power diaphragm 23 it is seen that it forms a motor chamber with the recess 24a in the lower face of the divider plate. This motor chamber is connected by an opening 24b in the divider plate with a pilot pressure chamber formed by diaphragm 27 stretched over the recess 24c in the top face of the divider plate. An annular rib 24d surrounds the upper end of the opening and forms a seat against which diaphragm 27 is forced on downward flexure of the diaphragm, thus closing the passage.

Divider plate 24 has two openings, 24e, and 24f, connected respectively with a bleeder assembly and a source of pilot pressure. The pilot pressure source is a conventional regulator shown diagrammatically at 34 and which may be connected to any source of fluid pressure. Thus the source of pilot pressure ultimately communicates with the atmosphere through opening or fitting 24f, the pilot pressure chamber, opening or duct 24b, the motor chamber, opening 24e and the bleeder when diaphragm 27 is in a raised position. With the diaphragm in a lower position, the bleeder relieves the pressure within the motor chamber. However, the passage 24b when completely open is of sufficient size to maintain substantially full pilot pressure against the motor diaphragm. The bleeder will be hereinafter more fully described.

In order to control or regulate the flow of pilot pressure fluid to the motor chamber, an opening or fitting 26a in the dome plate is connected through pipe 35 to the source of fluid pressure to be controlled. The pipe 35 is illustrated as connected with the pipe 14 in Figure 1, but of course may connect to any area in which the pressure to be controlled is present. As indicated in the drawing the upper and lower surfaces of diaphragm 27 are substantially equal in area so the ratio of pressure to be controlled to pilot pressure is substantially 1:1. In other words, when this ratio exceeds a predetermined value diaphragm 27 is caused to flex downwardly whereby it is seated on the annular rib 24d to close the passage 24b. It is noted that when the diaphragm 27 is in a normal unflexed position the pressure in recess 24c is acting beneath said diaphragm and the effective area of the under side of the diaphragm is that area which is equal to the diameter of the recessed portion 26d within the dome plate 26. The reason for this is that the peripheral edge portion of the diaphragm 27 which engages the under surface 26e of the dome plate is ineffective as a pressure area. Thus, the effective area of the under side of diaphragm 27 acted upon by pressure within recess 24c is the same as the upper effective area of said diaphragm within the recess 26d. When pressure in the recess 26d exceeds that of the pressure in area 24c, then diaphragm 27 moves downwardly and the entire area of the diaphragm between the annular line P becomes effective as the upper surface of the diaphragm. At the same time, since the diaphragm moves away from the surface 26e the entire lower surface 27 within the annular line P is an effective pressure area. It is thus obvious that the effective area of diaphragm 27 is the same on its upper and lower surfaces when it is acted upon by pressures within chambers 24c and 26d. The pressure in the chamber surrounding control member 33 reflects the pressure to be controlled. Thus, the flow control valve is responsive to the pressure to be controlled. The modified hook up shown in dotted lines in Fig. 1, where the ratio of pilot pressure to pressure to be controlled is other than 1:1, will be hereinafter described.

The adjustable bleeder assembly provides a means to control the type of action of the regulator. That is, an intermittent and a fixed bleed are used when the snap action is required and the fixed bleed alone is used if a throttle action is desired.

The bleed comprises a connection 36 with opening 24e. The connection in turn is provided with a fixed opening illustrated as a pet cock 37 in the drawings. This fixed opening is adjustable, but remains fixed between manipulations. The intermittent bleed in the embodiment shown in Fig. 1 includes a casing 38 which provides a cylinder in which member or piston 39 is loosely fit. The casing communicates at one end, through pipe 40, with connection 36 and its other end is closed by cap 41 having a valved or adjustable outlet 42. A ball 43 carried in the upper end of member 39 is adapted to seat in the outlet 42 when the member is in a raised position, thus closing the outlet.

The piston or member 39 is moved upwardly by the pressure differential across the member. The pressure within the motor chamber at which this movement occurs is dependent upon the size or fineness of the opening of valved outlet 42. As the outlet size is reduced the amount of pressure within the motor chamber required to move the piston upwardly increases. Thus a means is provided for varying the bleeder pressure or motor chamber pressure at which member 39 is moved upwardly to seat ball 33 against the outlet.

The intermittent bleed adjustment preferably is such that movement occurs when the pressure within the motor chamber is approximately that required to just move the regulator stem against the tension of spring 25 and the differential pressure across the seat of the flow control valve 16. The relation of piston weight and ball seat area are so designed that the minimum pressure in the motor chamber necessary to suspend the member is slightly more than is required to hold flow control valve 16 open against full spring compression. Thus, the valve stem does not move either up or down until the piston has moved. This adjustment effects a snap action regulation of flow control valve 16.

A throttle type regulatory action is obtained by simply closing valved outlet 42 of the intermittent bleeder. Then the rate of leak off through the fixed bleeder balances with the rate of feeding of pressure into the motor chamber which is controlled by the pressure to be controlled. This results in a throttling control of the main or flow control valve.

Referring to an alternate pressure hook-up, pipe 44 may be connected to the central opening 30a in the dome cap. The opening 30a is closed when not in use by plug 130a. Pipe 44 communicates with the pressure to be controlled. This pipe is in lieu of the connection between pipe 35 and opening 26a, with the latter being closed by plug 126a. Thus fluid under the pressure to be controlled is introduced into the chamber above diaphragm 31. This force is transmitted to the intermediate or pilot control diaphragm through control member 33. By adjusting the ratio of the upper and lower face areas of the control member a high pressure to be controlled may be regulated by using a comparatively low pilot pressure.

While the device has been described as a pressure reducing regulator it is contemplated that it may be used as a back pressure valve. In order to maintain a predetermined back pressure on a source of fluid pressure the pressure to be controlled may be connected to opening 24f and the pilot pressure introduced through either opening 26a or 30a. By this arrangement the pilot pressure serves to flex the pilot pressure diaphragm to close the pilot valve or passage 24b when the ratio of pilot pressure to pressure to be controlled exceeds a predetermined value. Thus, the flow control valve 16 is opened to permit passage of gas from the source of fluid pressure when the pressure in said source has exceeded a predetermined valve. In this respect the device serves as a back pressure valve. The operation and function of the bleed in this instance is similar to that outlined above.

In the modification of Fig. 2 the hook-up of the pilot pressure and pipe 44 are the same as that shown in Fig. 1 with the exception that pipe 44 is connected to the upstream pressure or the pressure fluid source and the device serves as a pressure relief valve. The valve 16 in this modification is adapted to seat against the upper edge of seat ring 15 to close the valve. A raising of the valve as normally affected by spring 25 opens the passage through the body.

In this modification a modified intermittent bleed assembly is shown comprising a body 45 mounted on connection 36. Ball valve 46 seats against a portion of reduced diameter 45a in the passage through body 45 to close the intermittent bleed. Instead of relying upon the force of gravity to urge the ball into an open position a spring pressed pin is provided to urge the ball valve toward the open position. The tension of this spring may be varied by manipulating thumb screw 46. This adjustment is comparable to the adjustment of the valved outlet 42 in the intermittent bleed shown in Fig. 1. The operation and overall adjustment of the intermittent bleed, of this modification, is the same as described in conjunction with the modification of Fig. 1.

It is believed that the operation of the device is obvious from the foregoing description. From this description it will be seen that the objects of this invention have been accomplished. There has been provided a regulator for a flow control valve which on proper adjustment performs efficiently either with a snap or throttle action. The construction of the device is such that it may be used either as a pressure reducing valve or a back pressure valve. The arrangement provides a regulator in which a low pilot pressure may be employed in conjunction with a relatively high pressure to be controlled. In addition, the pilot pressure diaphragm serves as the pilot valve controlling the admission of pilot pressure or power pressure to the motor chamber.

From the foregoing, it will be seen that this invention is one well adapted to attain all of the ends and objects hereinabove set forth, together with other advantages which are obvious and which are inherent to the structure.

It will be understood that certain features and sub-combinations are of utility and may be employed without reference to other features and sub-combinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having described the invention, what is claimed is:

1. In a pressure regulator for use in conjunction with a flow control valve for an outlet from a source of fluid pressure, said regulator including a housing, a chamber within the housing, a diaphragm forming one wall of the chamber and connected to the flow control valve whereby flexure of the diaphragm actuates said valve, a passage between the chamber and a pilot pressure chamber and means for opening and closing said passage, said means being responsive to the pressure to be controlled, the improvement which resides in a bleeder communicating with the chamber and having two outlets, an adjustable valve means for controlling flow through one of the outlets and adapted to remain fixed on adjustment, and a movable closure means for the other outlet exposed to the pressure within the chamber and adapted for intermittent closing and opening in response to the pressure within said chamber.

2. In a pressure regulator for use in conjunction with a flow control valve for an outlet from a source of fluid pressure, said regulator including a housing, a chamber within the housing, a diaphragm forming one wall of the chamber and connected to the flow control valve whereby flexure of the diaphragm actuates said valve, a passage between the chamber and a pilot pressure source and means for opening and closing said passage, said means being responsive to the pressure to be controlled, the improvement which resides in a bleeder communicating with the chamber and having two outlets, a member in one of the outlets exposed to the pressure in the chamber and movable into seating position thereagainst to close said outlet and to remain in seated position closing said outlet when the pressure differential across the member exceeds a predetermined value, and an adjustable valve means for controlling flow through the second outlet.

3. In a pressure regulator for use in conjunction with a flow control valve for an outlet from a source of fluid pressure, said regulator including a housing, a chamber within the housing, a diaphragm forming one wall of the chamber and connected to the flow control valve whereby flexure of the diaphragm actuates said valve, a passage between the chamber and a pilot pressure source and means for opening and closing said passage, said means being responsive to the pressure to be controlled, the improvement which resides in a bleeder communicating with said chamber and having two outlets, a member in one of the outlets adapted to seat thereagainst to close said outlet and to remain in seated position closing said outlet when the pressure differential across the member exceeds a predetermined value, adjustable means for controlling the escape of pressure from the outlet when the member is unseated to thereby vary the bleeder pressure at which the member is seated, and an adjustable valve means for controlling flow through the second outlet.

4. In a pressure regulator adaptable for use in conjunction with a flow control valve from a source of fluid pressure, said regulator including a housing having a chamber with a diaphragm forming one wall thereof, operable connections between the diaphragm and control valve including a spring for urging the valve toward one position, a passage adaptable to be connected to a pilot pressure source and means for opening and closing said passage, said means being responsive to the pressure to be controlled, the improvement which resides in a bleeder communicating with the chamber and having two outlets, a member mounted for limited movement with respect to one outlet and adapted to seat against said outlet to close it, the weight and seat area of said member being such that the minimum pressure required in the chamber to suspend the member is slightly greater than the pressure required to hold the flow control valve against the spring whereby a snap action of the valve is obtained, and adjustable valve means for controlling flow through the second outlet of the bleeder.

5. In a pressure regulator for use in conjunction with a flow control valve for an outlet from a source of fluid pressure, said regulator including a housing, a chamber within the housing, a diaphragm forming one wall of the chamber and connected to the flow control valve whereby flexure of the diaphragm actuates said valve, a passage between the chamber and a pilot pressure source and means for opening and closing said passage, said means being responsive to the pressure to be controlled, the improvement which resides in an adjustable bleeder assembly comprising a casing having an inlet communicating with said pressure chamber and an outlet, a member within said casing disposed in the line of flow between the inlet and outlet and adapted to be moved into seating engagement with the casing outlet to close said outlet by fluid passing through said casing at a predetermined rate whereby the closure of the outlet shuts off the escape of fluid through the outlet to build up the pressure in the chamber and thereby cause sudden flexing of the diaphragm to actuate the flow control valve with a snap action.

6. A pilot control mechanism for a motor-actuated regulating valve including, a housing having a chamber therein and having an opening extending from the chamber establishing communication between the chamber and the motor of said regulating valve, whereby pressure from said chamber may be utilized to actuate the regulating valve, a flexible pressure responsive valve element within the chamber overlying the opening and movable to open and closed positions for controlling the flow of pressure through the opening to the motor of said valve, means for conducting the primary pressure being controlled by the regulating valve to one side of said pressure responsive valve element, and means for conducting a pilot pressure fluid of a predetermined substantially constant pressure to the opposite side of said element, whereby the element is moved to open and closed positions by the differential in such pressures acting thereon so that the regulating valve is actuated in accordance with said differential.

7. A pilot control as set forth in claim 6, wherein the flexible pressure responsive element is a diaphragm which spans the chamber within the housing.

8. A pilot control assembly for a motor-actuated regulating valve including, a housing having a chamber therein with an outlet therein, means for establishing communication between said outlet and the motor of said regulating valve, a flexible pressure responsive element within the chamber overlying the outlet and arranged to engage or disengage said outlet to control flow therethrough, means for conducting a pilot pressure fluid of a predetermined constant pressure into the chamber below the pressure responsive element, and means for conducting the primary pressure fluid being controlled by the regulating valve to the chamber above the pressure responsive element, whereby said element is moved to open and close the outlet in accordance with the differential in the pressures acting thereon.

9. A pilot control assembly as set forth in claim 8, wherein the outlet is disposed in the lower portion of the chamber below the pressure responsive element, whereby when said outlet is open the pilot pressure is utilized to actuate the regulating valve, and a valve controlled bleeder unit communicating with the motor of the regulating valve for controlling escape of pressure from said motor.

10. A pilot control assembly as set forth in claim 8, wherein the flexible pressure responsive element presents different areas or surfaces to the opposing pressures acting thereon, whereby the ratio of one pressure to the other required to impart movement to the element is controlled in accordance with the ratio of the areas to each other.

11. A pilot control assembly as set forth in claim 8, together with a bleeder connected with the means which establishes communication between the chamber outlet and motor of the regulating valve, whereby the escape of pressure from said communicating means may be controlled.

12. A pilot control assembly as set forth in claim 8, together with a bleeder connected with the means which establishes communication between the chamber outlet and motor of the regulating valve, whereby the escape of pressure from said communicating means may be controlled, said bleeder having two outlets, adjustable valve means for one outlet, and a valve element for the second outlet exposed to the pressure which actuates the motor for intermittently opening and closing the second outlet in response to the pressure flowing within said communicating means to the motor of said regulating valve.

13. A pilot controller including, a housing having a motor chamber therein, a pilot pressure chamber within the housing, a transverse divider plate separating the chambers and having a passage establishing communication between the pilot pressure chamber and the motor chamber, a flexible pressure responsive valve element mounted within the pressure chamber adjacent the divider plate and adapted to move to positions opening and closing the communicating passage between said chambers, means for conducting a pilot pressure fluid of a substantially constant pressure to one side of the flexible pressure responsive element, and means for conducting a variable primary pressure which is to be controlled to the opposite side of said pressure element, whereby the element is actuated in accordance with the differential in pressures acting on opposite sides thereof to open and close the communicating passage between the chambers in accordance with said differential in pressures.

14. A pilot controller as set forth in claim 13, wherein the flexible pressure responsive element is a diaphragm which spans the pilot pressure chamber.

15. A pilot controller as set forth in claim 13, wherein the pilot pressure fluid normally acting against one side of the pressure responsive element is conducted to the motor chamber when the pressure responsive element is in a position opening the communicating passage.

16. A pilot controller as set forth in claim 13, wherein the flexible pressure responsive element presents different areas to the opposed pressures acting thereon, whereby the ratio of one pressure to the other required to impart movement to the element is controlled in accordance with the ratio of the areas to each other.

17. A pilot controller including, a housing having a motor chamber therein, a pilot pressure chamber within the housing, a transverse divider plate between the chambers and having an opening establishing communication between the pilot pressure chamber and the motor chamber, a flexible diaphragm within the pilot pressure chamber overlying the plate and movable relative thereto to open and close the opening, said flexible diaphragm functioning as a valve element for controlling flow through the opening means for conducting a pilot pressure fluid of a predetermined pressure to one side of the diaphragm and tending to urge said diaphragm to a position opening the communicating passage, a follower engaging the opposite side of the diaphragm and a second diaphragm engaging the opposite side of the follower, the area of the second diaphragm being less than the area of the first mentioned diaphragm, and means for conducting a primary pressure to be regulated to the second or smaller diaphragm, whereby this primary pressure acts on the main diaphragm through the follower and in opposition to the pilot pressure acting on the opposite side of said main diaphragm, whereby movement of the main diaphragm is controlled by the differential in pressures between the pilot pressure and the primary pressure as well as by the ratio of the effective areas acted upon by said pressures.

18. A pilot control mechanism for a motor-actuated regulating valve including, a housing having a chamber therein having communication with the motor of said regulating valve, whereby pressure from said chamber may be utilized to actuate the regulating valve, a flexible pressure responsive valve element within the chamber and movable to open and closed positions for controlling the flow of pressure to the motor of said valve, means for conducting the primary pressure being controlled by the regulating valve to one side of said pressure responsive valve element, and means for conducting a pilot pressure fluid of a predetermined pressure to the opposite side of said element, whereby the element is moved to open and closed positions by the differential in such pressures acting thereon so that the regulating valve is actuated in accordance with said differential, said pilot pressure being directed to the motor of the regulating valve when the flexible pressure responsive element is moved to an open position, and a valve controlled bleeder outlet extending from said motor of the regulating valve.

ASBURY S. PARKS.

References Cited in the file of this patent

UNITED STATES PATENTS

| Number | Name | Date |
|---|---|---|
| 1,402,016 | Raymond | Jan. 3, 1922 |
| 2,283,296 | Temple | May 19, 1942 |

FOREIGN PATENTS

| Number | Country | Date |
|---|---|---|
| 398,593 | France | Mar. 27, 1907 |